US009001889B2

United States Patent
Lu et al.

(10) Patent No.: US 9,001,889 B2
(45) Date of Patent: Apr. 7, 2015

(54) METHODS AND APPARATUS FOR IMPROVED QUANTIZATION ROUNDING OFFSET ADJUSTMENT FOR VIDEO ENCODING AND DECODING

(75) Inventors: Xiaoan Lu, Princeton, NJ (US); Qian Xu, Folsom, CA (US); Cristina Gomila, Cesson Sevigne (FR)

(73) Assignee: Thomson Licensing, Issy les Moulineaux (FR)

( * ) Notice: Subject to any disclaimer, the term of this patent is extended or adjusted under 35 U.S.C. 154(b) by 342 days.

(21) Appl. No.: 13/319,779

(22) PCT Filed: May 12, 2010

(86) PCT No.: PCT/US2010/001404
§ 371 (c)(1),
(2), (4) Date: Nov. 10, 2011

(87) PCT Pub. No.: WO2010/134963
PCT Pub. Date: Nov. 25, 2010

(65) Prior Publication Data
US 2012/0051421 A1    Mar. 1, 2012

Related U.S. Application Data

(60) Provisional application No. 61/178,957, filed on May 16, 2009.

(51) Int. Cl.
*H04N 11/04* (2006.01)
*H04N 19/179* (2014.01)
(Continued)

(52) U.S. Cl.
CPC ........... *H04N 19/179* (2014.11); *H04N 19/159* (2014.11); *H04N 19/176* (2014.11);
(Continued)

(58) Field of Classification Search
USPC ........................................ 375/240.03–240.05
See application file for complete search history.

(56) References Cited

U.S. PATENT DOCUMENTS

| 2004/0179608 A1 | 9/2004 | Holliman et al. |
| 2005/0041738 A1 | 2/2005 | Lin et al. |

(Continued)

FOREIGN PATENT DOCUMENTS

| JP | 2006067302 A | 3/2006 |
| JP | 2006157881 A | 6/2006 |
| WO | WO2009048501 | 4/2009 |

OTHER PUBLICATIONS

A Fine Rate Control Algorithm with Adaptive Rounding Offsets (ARO), Qian Xu, Xiaoan Lu, Yali Liu, and Cristina Golmila, IEEE Transactions on Circuits and Systems for Video Technology, vol. 19, No. 10, Oct. 2009.*

(Continued)

*Primary Examiner* — Geepy Pe
*Assistant Examiner* — Janese Duley
(74) *Attorney, Agent, or Firm* — Robert D. Shedd; Ronald J. Kolczynski

(57) ABSTRACT

There are provided methods and apparatus for improved quantization rounding offset adjustment for video encoding and decoding. An apparatus includes a video encoder for encoding an input coding unit by determining a residual for the input coding unit corresponding to a difference between the input coding unit and a reference coding unit, applying a transform to the residual to obtain at least one transform coefficient, and quantizing the at least one transform coefficient by selecting a particular quantization step size and a rounding offset.

21 Claims, 12 Drawing Sheets

(51) Int. Cl.

| | | |
|---|---|---|
| *H04N 19/159* | (2014.01) | |
| *H04N 19/176* | (2014.01) | |
| *H04N 19/172* | (2014.01) | |
| *H04N 19/124* | (2014.01) | |
| *H04N 19/14* | (2014.01) | |
| *H04N 19/174* | (2014.01) | |
| *H04N 19/17* | (2014.01) | |

(52) U.S. Cl.
CPC ........... *H04N19/172* (2014.11); *H04N 19/124* (2014.11); *H04N 19/14* (2014.11); *H04N 19/174* (2014.11); *H04N 19/17* (2014.11)

(56) References Cited

U.S. PATENT DOCUMENTS

| | | |
|---|---|---|
| 2006/0098733 A1 | 5/2006 | Matsumura et al. |
| 2006/0126724 A1 | 6/2006 | Cote et al. |
| 2006/0268990 A1 | 11/2006 | Lin et al. |
| 2009/0086814 A1* | 4/2009 | Leontaris et al. ........ 375/240.02 |

OTHER PUBLICATIONS

Quantization Offsets for Video Coding, Thomas Wedi and Steffen Wittmann, IEEE International Symposium on Circuits and Systems, vol. 1, p. 324-327, May 23-26, 2005.*
A Novel Fine Rate Control Algorithm with Adaptive Rounding Offset, Yali Liu, Cristina Gomila, Qian Xu, IEEE International Symposium on Circuits and Systems, p. 3490-3493, May 2008.*
WO 2009/048501 A2, Yali Liu, Xiaoan Lu, Cristina Gomila, Qian Xu, Apr. 16, 2009.*
He et al., "A Linear Source Model and a Unified Rate Control Algorithm for DCT Video Coding", IEEE Transactions on Circuits and Systems for Video Technology, vol. 12, No. 11, Nov. 2002, pp. 970-982.
Westerink et al., "Two-Pas MPEG-2 Variable-Bit-Rate Encoding", IBM J. Res. Develop., vol. 43, No. 4, Jul. 1999, pp. 471-488.
Itu-T H.264, International Telecommunication Union, "Advanced Video Coding for Generic Audiovisual Services", Mar. 2005, pp. 1-343.
Search Report Dated Aug. 31, 2010.

* cited by examiner

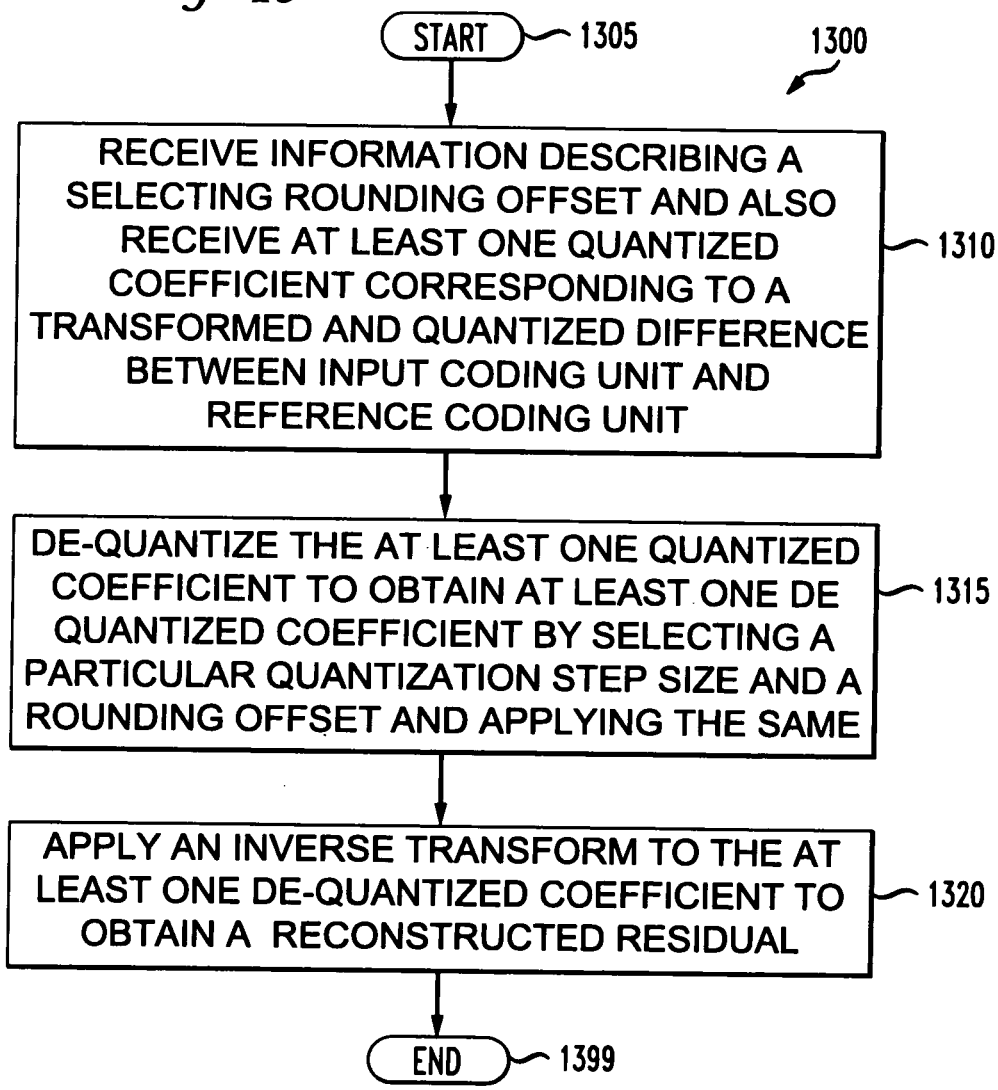

METHODS AND APPARATUS FOR IMPROVED QUANTIZATION ROUNDING OFFSET ADJUSTMENT FOR VIDEO ENCODING AND DECODING

CROSS-REFERENCE TO RELATED APPLICATIONS

This application claims the benefit, under 35 U.S.C. §365 of International Application PCT/US2010/001404, filed May 12, 2010, which was published in accordance with PCT Article 21(2) on Nov. 25, 2010 in English and which claims the benefit of U.S. provisional patent application No. 61/178, 957, filed May 16, 2009.

TECHNICAL FIELD

The present principles relate generally to video encoding and decoding and, more particularly, to methods and apparatus for improved quantization rounding offset adjustment for video encoding and decoding.

BACKGROUND

Most video applications seek the highest possible perceptual quality given the bit rate constraints. For instance, in a low bit rate application such as a videophone system, a video encoder may provide higher quality by eliminating the strong visual artifacts at the regions of interest that are visually more important. On the other hand, in a high bit rate application, visually lossless quality is expected everywhere in the pictures and a video encoder needs to also achieve transparent quality. One challenge in obtaining transparent visual quality in high bit rate applications is to preserve details, especially at smooth regions where loss of details are more visible than at non-smooth regions because of the texture masking property of the human visual system.

Increasing the bit rate is one of the most straightforward approaches to improve the quality. When the bit rate is given, an encoder manipulates its bit allocation module to spend the available bits where the most visual quality improvement can be obtained. In non-real-time applications such as DVD authoring, the video encoder can facilitate a variable-bit-rate (VBR) design to produce a video with a constant quality over time on both difficult and easy contents. In such applications, the available bits are appropriately distributed over the different video segments to obtain constant quality. In contrast, a constant-bit-rate (CBR) system assigns the same number of bits to an interval of one or more pictures despite their encoding difficulty and produces visual quality that varies with the video content. For both VBR and CBR encoding systems, an encoder can allocate bits according to perceptual models within a picture. One characteristic of human perception is texture masking, which explains why human eyes are more sensitive to loss of quality in smooth regions than in textured regions. This property can be utilized to increase the number of bits allocated to smooth regions to obtain a high visual quality.

The quantization process in a video encoder controls the number of encoded bits and the quality. It is common to adjust the quality through adjusting the quantization parameters. For illustrative purposes, we refer to the International Organization for Standardization/International Electrotechnical Commission (ISO/IEC) Moving Picture Experts Group-4 (MPEG-4) Part 10 Advanced Video Coding (AVC) standard/ International Telecommunication Union, Telecommunication Sector (ITU-T) H.264 Recommendation (hereinafter the "MPEG-4 AVC Standard") as a baseline example to explain the quantization process and improvements that may be had by implementing the present principles over the MPEG-4 Standard. However, it is to be appreciated that the present principles are not limited solely to the MPEG-4 AVC Standard and, thus, may be applied to other video coding standards, recommendations, and extensions thereof, while maintaining the spirit of the present principles.

Mathematically, in the encoder the transformed coefficients are quantized as follows:

$$Z = \left\lfloor \frac{|W|}{q} + s \right\rfloor \cdot \mathrm{sgn}(W), \tag{1}$$

where W is the transformed coefficient and is quantized to a quantization level Z. Here, q is the quantization step size and s is the quantization rounding offset. The function $\lfloor . \rfloor$ rounds a value to the nearest integer and sgn (.) returns the sign of a signal. When the quantization matrix is applied, the coefficients are scaled first before the quantization process at the encoder. The range of W where it is quantized to 0 is called the deadzone. In this particular case, the deadzone is $\Delta = (1-s) \times q \times 2$. At the decoder, the quantization level Z is reconstructed to the signal W'. This is called inverse quantization and is described mathematically as follows:

$$W' = q \cdot Z. \tag{2}$$

The syntax in the MPEG-4 AVC Standard allows q to be different for each macroblock (MB). The value of the quantization step size q is selected from the ones indexed by parameter QP, an integer in the range of 0-51. The rounding offset parameter s, is not involved in the inverse quantization and the encoder has the flexibility of setting it to any value.

Existing MPEG-4 AVC video encoders assume the quantization rounding offset is constant and only adjust the quantization step size to adjust the number of bits and therefore the quality.

SUMMARY

These and other drawbacks and disadvantages of the prior art are addressed by the present principles, which are directed to methods and apparatus for improved quantization rounding offset adjustment for video encoding and decoding.

According to an aspect of the present principles, there is provided an apparatus. The apparatus includes a video encoder for encoding an input coding unit by determining a residual for the input coding unit corresponding to a difference between the input coding unit and a reference coding unit, applying a transform to the residual to obtain at least one transform coefficient, and quantizing the at least one transform coefficient by selecting a particular quantization step size and a rounding offset.

According to another aspect of the present principles, there is provided, in a video encoder, a method for encoding an input coding unit. The method includes determining a residual for the input coding unit corresponding to a difference between the input coding unit and a reference coding unit, applying a transform to the residual to obtain at least one transform coefficient, and quantizing the at least one transform coefficient by selecting a particular quantization step size and a rounding offset.

According to yet another aspect of the present principles, there is provided an apparatus. The apparatus includes a video decoder for decoding a coding unit by receiving at least one quantized coefficient corresponding to a transformed and quantized residual between an original version of the coding unit and a reference coding unit, de-quantizing the at least one quantized coefficient to obtain at least one de-quantized coefficient by determining a particular quantization step size and a rounding offset, and applying an inverse transform to the at least one de-quantized coefficient to obtain a reconstructed residual. The video decoder receives information describing the selected rounding offset from a bitstream that includes the at least one quantized coefficient.

According to still another aspect of the present principles, there is provided, in a video decoder, a method for decoding a coding unit. The method includes receiving at least one quantized coefficient corresponding to a transformed and quantized residual between an original version of the coding unit and a reference coding unit, de-quantizing the at least one quantized coefficient to obtain at least one de-quantized coefficient by selecting a particular quantization step size and a rounding offset, and applying an inverse transform to the at least one de-quantized coefficient to obtain a reconstructed residual. The video decoder receives information describing the selected rounding offset from a bitstream that includes the at least one quantized coefficient.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which:

FIG. 13 is a flow diagram showing an exemplary method for decoding a coding unit at a decoder using rounding offsets, in accordance with an embodiment of the present principles.

DETAILED DESCRIPTION

Figure 1:
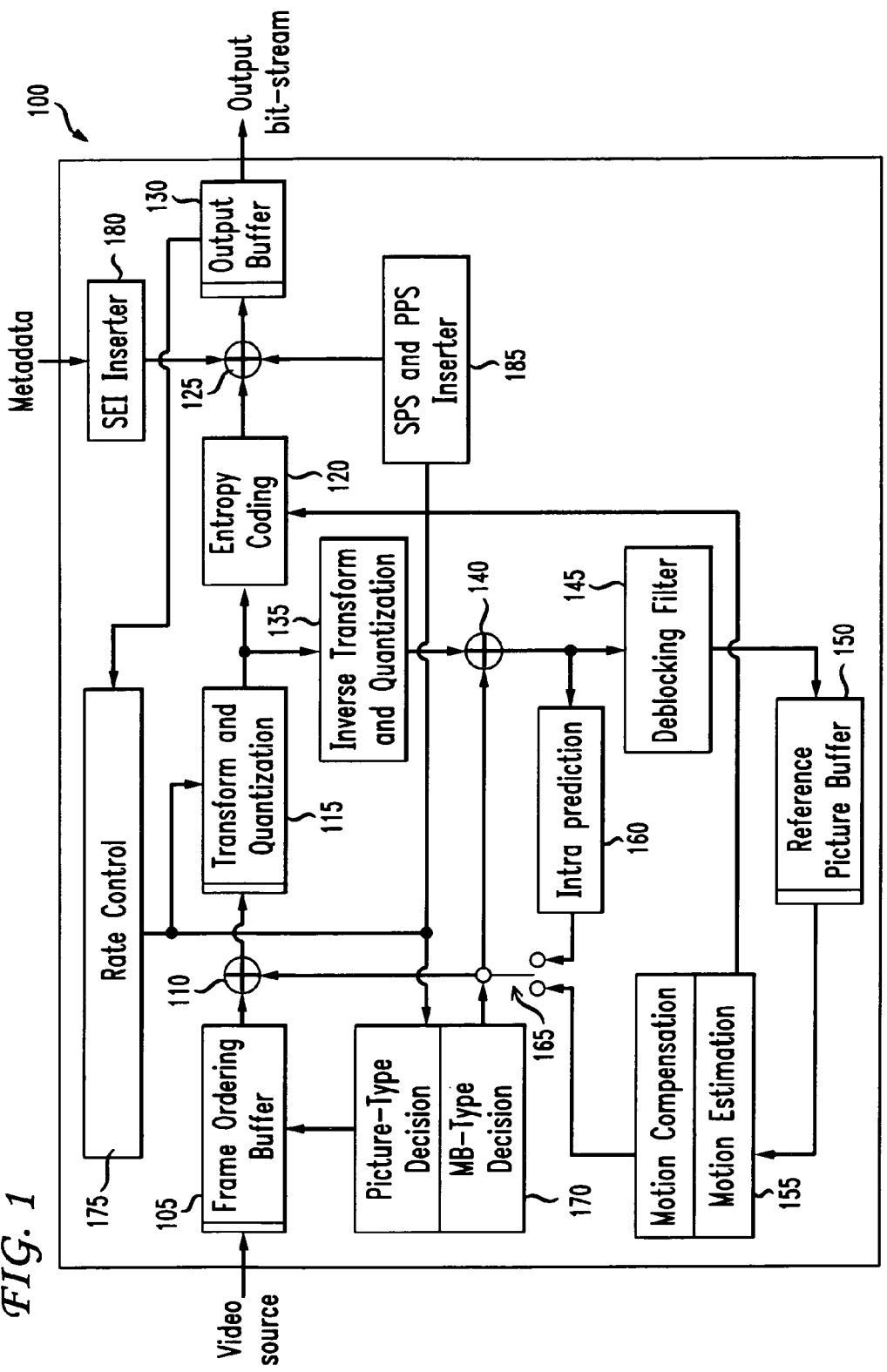
FIG. 1 is a block diagram showing an exemplary video encoder to which the present principles may be applied, in accordance with an embodiment of the present principles.

The present principles are directed to methods and apparatus for improved quantization rounding offset adjustment for video encoding and decoding.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Also, as used herein, the words "picture" and "image" are used interchangeably and refer to a still image or a picture from a video sequence. As is known, a picture may be a frame or a field.

Additionally, as used herein, the phrase "picture region" (or simply "region" for short") refers to a portion of a picture encompassing and/or otherwise formulated from, for example, one or more blocks or arbitrary shapes of any size. The one or more blocks may relate to, for example, a super macroblock, a macroblock, a macroblock partition, a sub-macroblock partition, and so forth.

Moreover, as used herein, the phrase "portion of a video sequence" refers to one or more Groups of Pictures (GOPs), one or more pictures included in or independent of one of more GOPs, and/or one or more scenes.

Further, as used herein, the phrase "input coding unit" refers to any of a picture (e.g., frame or field), picture region, and/or slice.

Also, as used herein, the phrase "default rounding offset" refers to the rounding offset (i.e., constant rounding offset) that is typically used by a particular video encoder and/or decoder, such as that used with respect to, for example, a video coding standard, recommendation, extension thereof, and so forth with which such video encoder and/or decoder operates in compliance with.

Additionally, as used herein, the word "signal" refers to indicating something to a corresponding decoder. For example, the encoder may signal a particular one of a group of rounding offsets in order to make the decoder aware of which particular rounding offset was used on the encoder side. In this way, the same function may be used at both the encoder side and the decoder side. Thus, for example, an encoder may transmit a particular rounding offset to the decoder so that the decoder may use the same particular rounding offset or, if the decoder already has the particular rounding offset as well as others, then signaling may be used (without transmitting) to simply allow the decoder to know and select the particular rounding offset. By avoiding transmission of any actual rounding offsets, a bit savings may be realized. It is to be appreciated that signaling may be accomplished in a variety of ways. For example, one or more syntax elements, flags, and so forth may be used to signal information to a corresponding decoder.

Turning to FIG. 1, an exemplary video encoder to which the present principles may be applied is indicated generally by the reference numeral 100. The encoder 100 includes a frame ordering buffer 105. A first input of the frame ordering buffer 105 is available as an input to the encoder 100. An output of the frame ordering buffer 105 is connected in signal communication with a first non-inverting input of a combiner 110. An output of the combiner 110 is connected in signal communication with a first input of a transformer and quantizer 115. An output of the transformer and quantizer 115 is connected in signal communication with a first input of an entropy coder 120 and an input of an inverse transformer and quantizer 135. An output of the entropy coder is connected in signal communication with a first non-inverting input of a combiner 125. An output of the combiner 125 is connected in signal communication with an input of an output buffer 130. A first output of the output buffer 130 is connected in signal communication with an input of a rate controller 175. An output of the rate controller 175 is connected in signal communication with a second input of the transformer and quantizer 115, an input of a picture-type and macroblock (MB) type decision module 170, and an input of a Sequence Parameter Set (SPS) and Picture Parameter Set (PPS) inserter 185. A first output of the picture-type and macroblock-type decision module 170 is connected in signal communication with a second input of the frame ordering buffer 105. A second output of the picture-type and macroblock-type decision module 170 is connected in signal communication with a first non-inverting input of a combiner 140, a second non-inverting input of the combiner 110, and with an output of a switch 165. An input of the switch 165 is connected in signal communication with either a second output of a motion compensator/motion estimator 155 or an output of an intra prediction module 160. An output of the combiner 140 is connected in signal communication with an input of the intra prediction module 160 and an input of a deblocking filter 145. An output of the deblocking filter 145 is connected in signal communication with an input of a reference picture buffer 150. An output of the reference picture buffer 150 is connected in signal communication with an input of the motion compensator/motion estimator 155. A first output of the motion compensator/motion estimator 155 is connected in signal communication with a second input of the entropy coder 120. An output of the SPS and PPS inserter 185 is connected in signal communication with a second non-inverting input of the combiner 125. An output of a Supplemental Enhancement Information (SEI) inserter 180 is connected in signal communication with a third non-inverting input of the combiner 125. An input of the SEI inserter 180 is available as an input to the encoder 100, for receiving metadata. A second output of the output buffer 130 is available as an output of the encoder 100, for outputting a bitstream.

Figure 2:
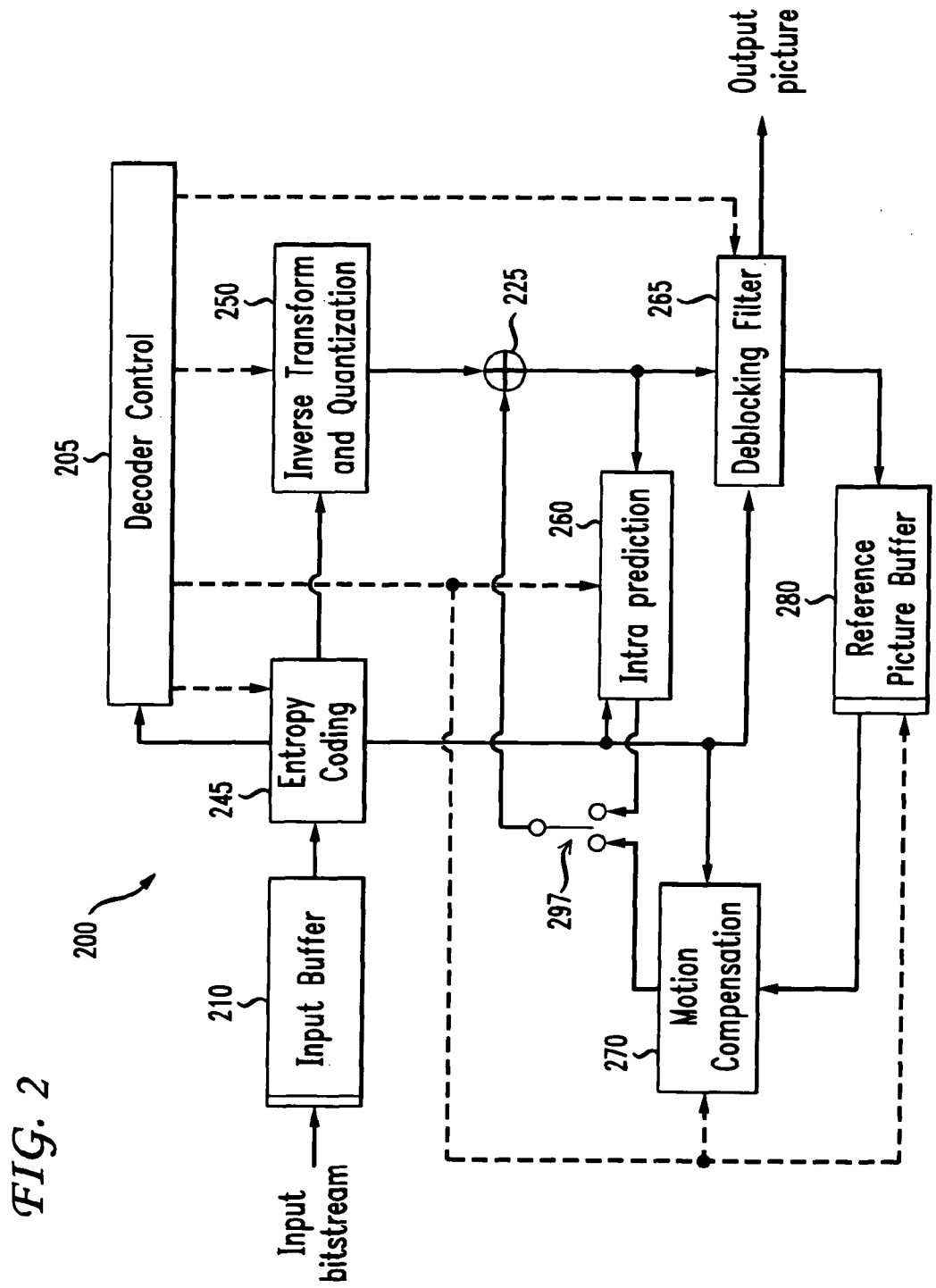
FIG. 2 is a block diagram showing an exemplary video decoder to which the present principles may be applied, in accordance with an embodiment of the present principles.

Turning to FIG. 2, an exemplary video decoder to which the present principles may be applied is indicated generally by the reference numeral 200. The video decoder 200 includes an input buffer 210 having an output connected in signal communication with a first input of the entropy decoder 245. A first output of the entropy decoder 245 is connected in signal communication with a first input of an inverse transformer and inverse quantizer 250. An output of the inverse transformer and inverse quantizer 250 is connected in signal communication with a second non-inverting input of a combiner 225. An output of the combiner 225 is connected in signal communication with a second input of a deblocking filter 265 and a first input of an intra prediction module 260. A second output of the deblocking filter 265 is connected in signal communication with a first input of a reference picture buffer 280. An output of the reference picture buffer 280 is connected in signal communication with a second input of a motion compensator 270.

A second output of the entropy decoder 245 is connected in signal communication with a third input of the motion compensator 270 and a first input of the deblocking filter 265. A third output of the entropy decoder 245 is connected in signal communication with an input of a decoder controller 205. A first output of the decoder controller 205 is connected in signal communication with a second input of the entropy decoder 245. A second output of the decoder controller 205 is connected in signal communication with a second input of the inverse transformer and inverse quantizer 250. A third output of the decoder controller 205 is connected in signal communication with a third input of the deblocking filter 265. A fourth output of the decoder controller 205 is connected in signal communication with a second input of the intra prediction module 260, with a first input of the motion compensator 270, and with a second input of the reference picture buffer 280.

An output of the motion compensator 270 is connected in signal communication with a first input of the switch 297. An output of the intra prediction module 260 is connected in signal communication with a second input of the switch 297. The output of the switch 297 is further connected in signal communication with a first non-inverting input of the combiner 225.

An input of the input buffer 210 is available as an input of the decoder 200, for receiving an input bitstream. A first output of the deblocking filter 265 is available as an output of the decoder 200, for outputting an output picture.

The rounding offset can be used in, for example, decoder 200 for reconstructing the video or for post-processing. Under this circumstance, the rounding offsets should be embedded in the bitstream (e.g., by encoder 100) and conveyed to decoder 200. In one embodiment, one rounding offset can be set for each picture or a group of pictures. In another embodiment, the rounding offset can be set for each macroblock and its actual value or index is sent for each macroblock.

As noted above, the present principles are directed to methods and apparatus for improved rounding offset adjustment for video encoding and decoding.

One important aspect in improving the perceptual quality is to preserve the fine details, such as film grain and computer-generated noise. It is especially important to the smooth areas where the loss of fine details is highly noticeable. A common approach in existing algorithms is to encode these smooth regions or the video segments that include smooth regions at finer quantization step sizes, while using a constant quantization rounding offset.

As can be seen from Equation (1), the rounding offset has a pronounced control on the small coefficients as it directly controls how the small near-zero coefficients are quantized. When we increase s, fewer coefficients are quantized to zeros and more bits are spent on the small coefficients given the quantization step size q. When the rate is given, an increased s needs to operate with a coarser q to meet the bit rate constraints. Therefore, increasing the rounding offset may preserve the small coefficients at the cost of more distortions to the big coefficients. Since preserving small coefficients preserves fine details in reconstructed video, including but not limited to film grain and computer-generated noise, adjusting the rounding offset value in accordance with the present principles can be very effective in obtaining high perceptual quality for some applications, such as Blu-Ray DVD authoring where transparent visual quality is expected.

In the following description, we use TM5 (Test Model, version 5) to illustrate how higher quality is obtained for smooth regions within a picture. The Test Model evolved in parallel with the MPEG video working draft. Of course, the present principles are not limited solely to TM5 and may be readily used with other video coding standards, recommendations and/or extensions thereof, while maintaining the spirit of the present principles.

Furthermore, in the following description, we use a two-pass encoder to show how higher quality is assigned to the video segments that include smooth regions. Of course, the present principles are not limited to a two-pass encoder and, thus, a single-pass encoder may also be used, as well as an encoder that using more than two passes, while maintaining the spirit of the present principles.

In TM5, a spatial activity measure is computed for MB j from the four luminance frame-organized sub-blocks (n=1, . . . , 4) and the four luminance field-organized sub-blocks (n=5, . . . , 8) using the original pixel values:

$$\text{act}_j = 1 + \min(vblk_1, vblk_2, \ldots, vblk_8), \quad (3)$$

where $$vblk_n = \frac{1}{64} \times \sum_{k=1}^{64} (P_k^n - P_{mean_n})^2, \quad (4)$$

and $$P_{mean_n} = \frac{1}{64} \times \sum_{k=1}^{64} P_k^n, \quad (5)$$

where $P_k^n$ are the sample values in the $n^{th}$ original 8×8 block. $\text{act}_j$ is then normalized to the following:

$$N\_act_j = \frac{2 \times act_j + \text{avg\_act}}{act_j + 2 \times \text{avg\_act}}, \quad (6)$$

where avg_act is the average value of $act_j$ of the previous encoded picture. On the first picture, avg_act is set to 400. $mquant_j$ is obtained as follows:

$$mquant_j = Q_j \times N\_act_j, \quad (7)$$

where $Q_j$ is a reference quantization parameter. The final value of $mquant_j$ is clipped to the range [1 . . . 31] and is used to indicate the quantization step size during encoding.

Therefore, in a TM5 quantization scheme, a smooth macroblock (MB) with a smaller variance has a smaller value of a spatial activity measure $act_j$ and $N\_act_j$, and a finer quantization step size indexed by $mquant_j$. With finer quantization for a smooth macroblock, more fine details can be preserved and higher perceptual quality can be obtained.

In a non-real-time application, the encoder can analyze the whole video and increase the number of allocated bits to the segment of video that includes fine details. One prior art approach proposes a two-pass encoding system, where the first-pass constant-bit-rate (CBR) data was processed to prepare the control parameters for the second pass, which performed the actual variable-bit-rate (VBR) compression. Specifically, in the second pass, the $i^{th}$ picture sets the target number of bits $b_{2,i}$ to the following:

$$b_{2,i} = k b_{1,i}(Q_{1,i})^p, \quad (8)$$

where $b_{1,i}$ and $Q_{1,i}$ are the number of bits and quantization step size parameter from the first pass, respectively, p is a constant, and $$k = \frac{B_{tot}}{\sum_{i=1}^{N} b_{1,j}(Q_{1,i})^p}, \quad (9)$$

where $B_{tot}$ is the number of overall available bits and N is the total number of pictures.

In this two-pass encoding system, a scene with lower compression complexity, such as a scene with smooth regions, will be encoded at smaller finer quantization step sizes and higher peak signal-to-noise ratios (PSNRs) which usually translate into higher perceptual quality.

As previously described, the existing methods adjust the quantization step sizes in the encoder to achieve high perceptual quality in order to preserve fine details at smooth regions. In accordance with at least one embodiment of the present principles, we introduce the rounding offset adjustment into the encoder to improve the perceptual quality in smooth regions.

In accordance with at least one embodiment, we describe a method and apparatus to effectively improve the perceptual quality by adjusting the rounding offset. Thus, we aim to preserve fine details in reconstructed video. This is especially important to the smooth areas where the loss of fine details is highly noticeable. In a preferred embodiment, the scheme is flexible enough to allow the encoder to select the rounding offset on a scene level, a picture level, a macroblock level, and so forth. It can be also integrated into an encoder where the quantization step size is adjusted to improve the perceptual quality.

Quantization Adjustment to Improve Perceptual Quality

Figure 3:
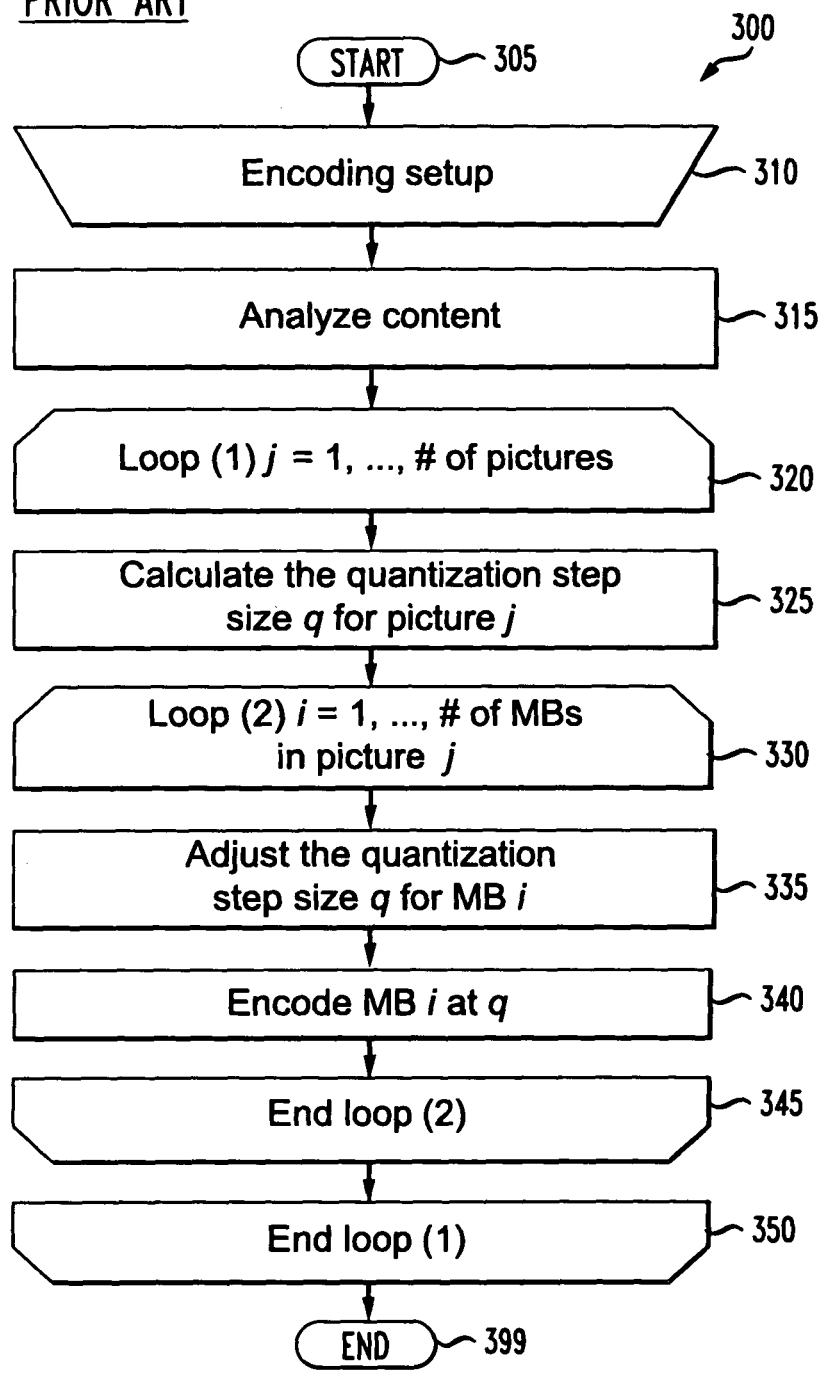
FIG. 3 is a flow diagram showing a method for quantization adjustment to improve perceptual quality in a video encoder, in accordance with the prior art.

Turning to FIG. 3, a method for quantization adjustment to improve perceptual quality in a video encoder is indicated generally by the reference numeral 300. The only adjustable quantization parameter in such a method is the quantization step size. The rounding offset parameter is constant throughout the encoding process. The method 300 includes a start block 305 that passes control to a function block 310. The function block 310 performs an encoding setup, optionally with the aid of an operator, and passes control to a function block 315. With respect to function block 310, the encoding setup performed thereby may involve the setup of the target bit rate as well as the specification of any set of parameters involved in the encoding process. The function block 315 analyzes the input video content, and passes control to a loop limit block 320. With respect to function block 315 and the case of CBR encoding, the task for content analysis may include minor adjustment of the target number of bits for the current picture based on its content. With respect to function block 315 and the case of VBR, the content analysis module can include the actual encoding of the whole video in order to obtain the coding complexity and adaptively allocate available bits to the video. The loop limit block 320 begins a loop (1) over each picture in the input video content, using a variable j=1, . . . , # of pictures, and passes control to a function block 325. The function block 325 calculates the reference quantization step size q for picture j from the target number of bits, and passes control to a loop limit block 330. The loop limit block 330 begins a loop (2) over each macroblock in a current picture, using a variable i=1, . . . , # of macroblocks (MB) in picture j, and passes control to a function block 335. The function block 335 adjusts the quantization step size q for MB i based on its content and/or the previous encoding results, and passes control to a function block 340. With respect to function block 335, for example, a smooth MB will lower q to improve the perceptual quality. In another example, if the previous MBs use more bits than they have been originally assigned, the current MB will increase q to consume fewer bits than what is originally assigned. This calculation can be based on the ρ-domain rate model or TMN8 rate model, just to name a few. The function block 340 encodes macroblock i at q, and passes control to a loop limit block 345. The loop limit block 345 ends the loop (2), and passes control to a loop limit block 350. The loop limit block 350 ends the loop (1), and passes control to an end block 399.

In this approach, a fixed rounding offset is applied to all encoded pictures and only the quantization step size is adjusted. For example, in many MPEG-4 AVC Standard video encoding applications, the rounding offset is by default set to 1/3.0 and 1/6.0 for an INTRA and INTER picture, respectively. Given the bit rate constraints, adjusting the quantization step size alone cannot always provide the highest possible perceptual quality to a video segment. What is more, a fixed rounding offset does not always fit the various video characteristics.

Rounding Offset Adjustment to Improve Perceptual Quality

In accordance with an at least one embodiment, we describe a method and apparatus for adjusting the rounding offset s, in addition to adjusting the quantization step size, to improve the perceptual quality. The adjustment can be applied to the whole video, a segment of video, a region in a picture, and so forth.

Figure 4:
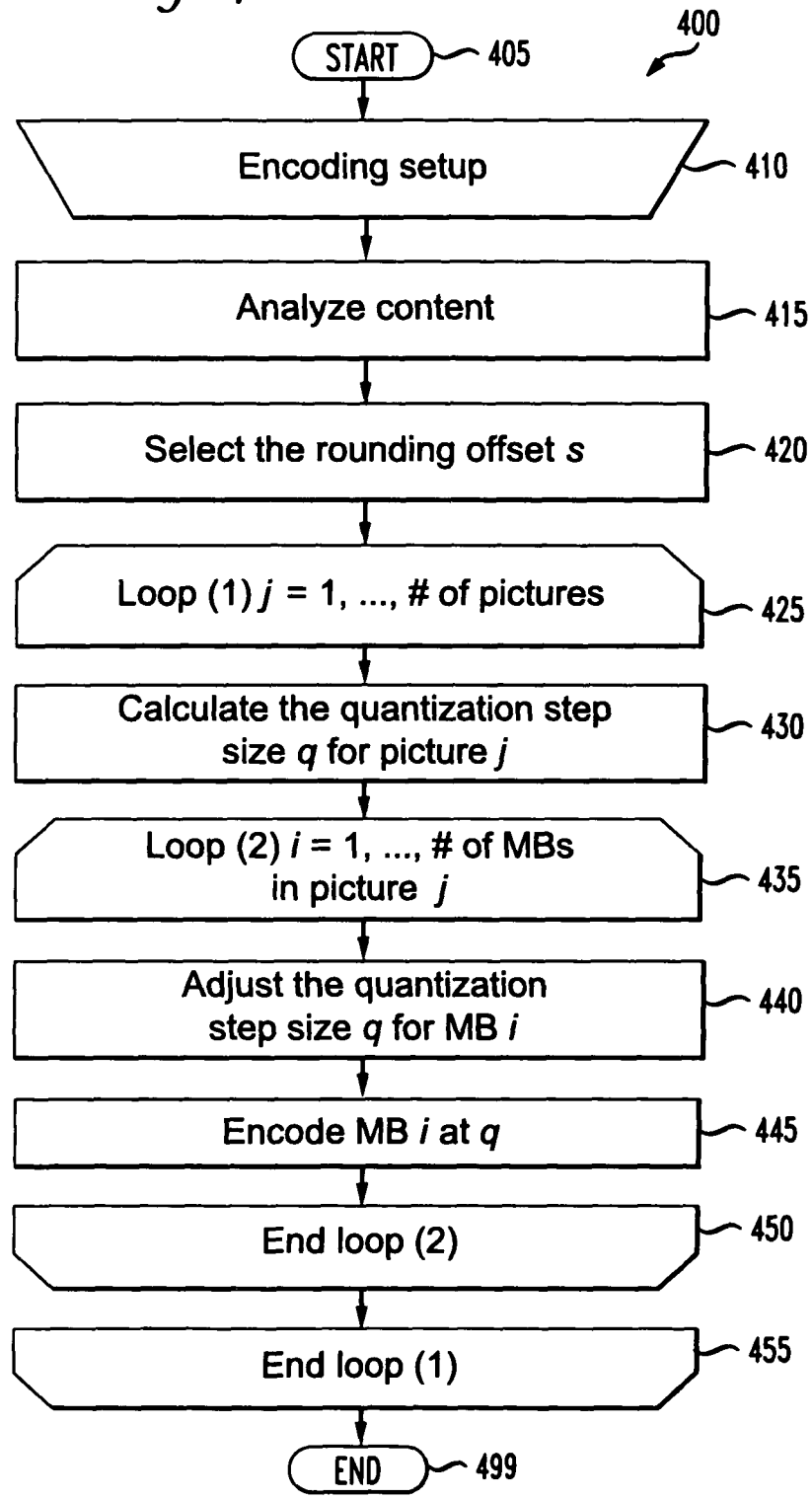
FIG. 4 is a flow diagram showing an exemplary method for rounding offset adjustment on a picture level to improve perceptual quality, in accordance with an embodiment of the present principles.
Figure 5:
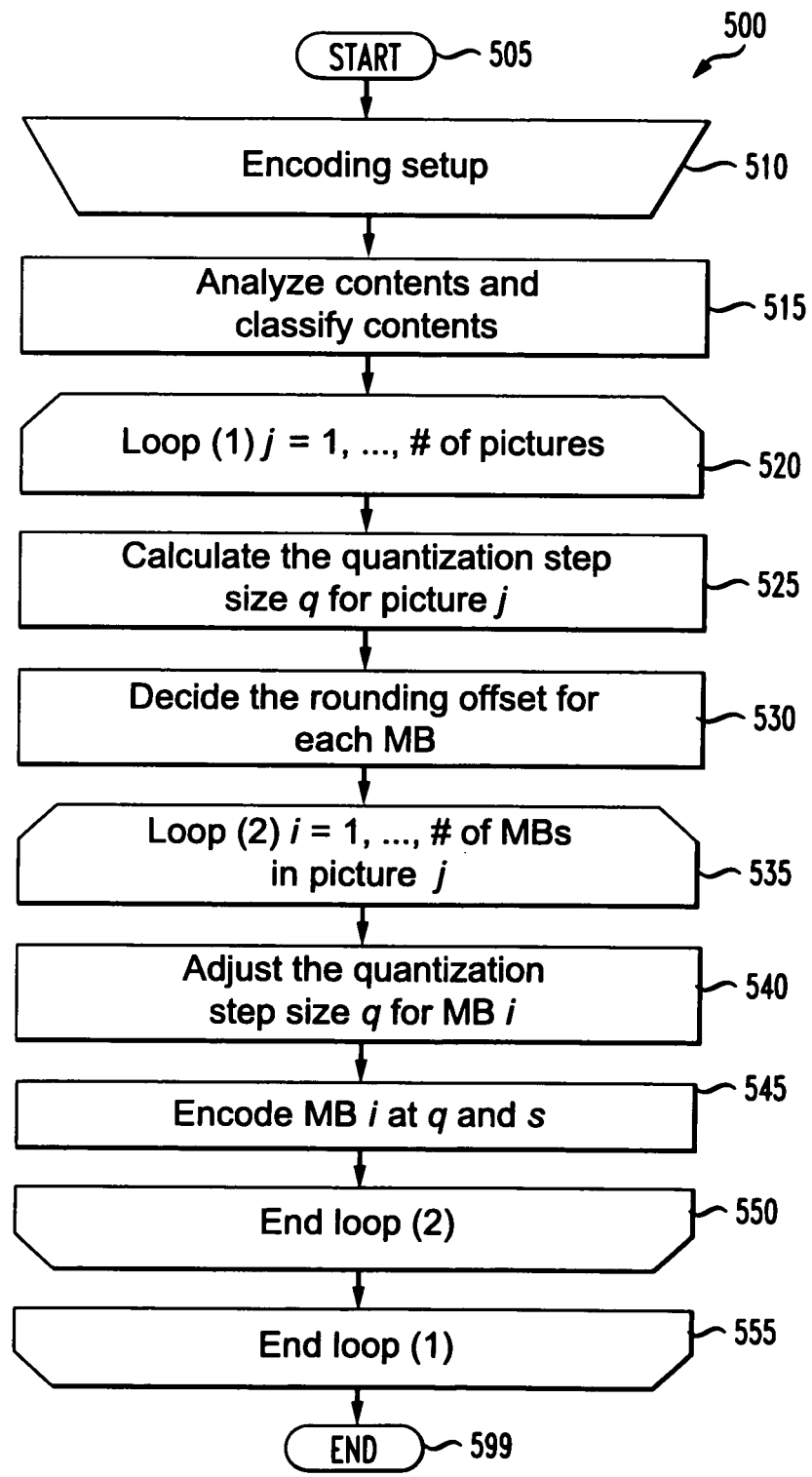
FIG. 5 is a flow diagram showing an exemplary method for rounding offset adjustment on a macroblock level to improve perceptual quality, in accordance with an embodiment of the present principles.

FIGS. 4 and 5 illustrate particular embodiments that include the rounding offset besides the quantization step size in the quantization adjustment process. Depending on how the number of bits is allocated, illustrated embodiments could serve a variable-bit-rate (VBR) or constant-bit-rate (CBR) application. It can also be a part of a multi-pass encoder and provides information for other passes. These and various other applications and scenarios to which the present principles may be applied are readily determined by one of ordinary skill in this and related arts, while maintaining the spirit of the present principles.

Embodiment 1

FIG. 4 illustrates how the quantization rounding offset is adaptively selected to improve the perceptual quality. In this method, the encoder analyzes the content to decide a rounding offset s automatically. The decision rules can be designed separately for INTER and INTRA coding, different transforms, different bit rates, and so forth. The analysis can be done on the whole video that is to be encoded or on a portion of the video to save computational complexity. When the workflow in FIG. 4 is applied to the whole video all pictures will have the same rounding offset, while when the workflow is applied to a scene all pictures in a scene share the same rounding offset and the value can differ from one scene to another scene. While the scene-adaptive solution requires more computational complexity, it is more flexible and can better adapt to the content in obtaining high perceptual quality. The workflow can also be applied to one individual picture and each picture may select a different rounding offset. Since the video is usually stationary within one scene, encoding the pictures within one scene with different rounding offsets may cause visual quality inconsistence within the scene.

Turning to FIG. 4, an exemplary method for rounding offset adjustment on a picture level to improve perceptual quality is indicated generally by the reference numeral 400. The method 400 includes a start block 405 that passes control to a function block 410. The function block 410 performs an encoding setup, optionally with the aid of an operator, and passes control to a function block 415. The function block 415 analyzes input video content, and passes control to a function block 420. The function block 420 adaptively selects the rounding offset s, and passes control to a loop limit block 425. The loop limit block 425 begins a loop (1) over each picture in the input video content, using a variable j=1, . . . , # of pictures, and passes control to a function block 430. The function block 430 calculates the reference quantization step size q for picture j given the bit rate constraint and the rounding offset s, and passes control to a loop limit block 435. The loop limit block 435 begins a loop (2) over each macroblock in a current picture, using a variable i=1, . . . , # of macroblocks (MB) in picture j, and passes control to a function block 440. The function block 440 adjusts the quantization step size q for MB i based on its content, and passes control to a function block 445. The function block 445 encodes macroblock i at q, and passes control to a loop limit block 450. The loop limit block 450 ends the loop (2), and passes control to a loop limit block 455. The loop limit block 455 ends the loop (1), and passes control to an end block 499.

In method 400, the rounding offset value adapts to the content from picture to picture, and all MBs in one picture use the same rounding offset. One advantage of method 400 is that it adapts to the content and it is simple to integrate. One disadvantage of method 400 is that it does not differentiate the smooth areas and textured areas and blindly assigns the same rounding offset to all MBs. When the bit rate is limited, the extra bits spent in the textured areas due to the rounding offset adjustment cause the picture to encode at a larger quantization step size and prevent the encoder from obtaining a higher quality.

Embodiment 2

FIG. 5 illustrates a variation of the method described in FIG. 4. In the proposed method of FIG. 5, a rounding offset is decided for each MB. In one embodiment, each MB will choose one of two pre-defined values. Of course, embodiments of the present principles are not limited to solely two pre-defined values for the rounding offset and, thus, other than two values may be used, while maintaining the spirit of the present principles. In this embodiment, each picture can be divided into two classes of MBs, namely textured and smooth. Since it is more important to keep the fine details in the smooth areas, a rounding offset will be assigned to these regions to preserve more small coefficients. In contrast, the loss of fine details is less visible in the textured regions because of the texture masking effect, and another rounding offset will be assigned without spending too many bits in small coefficients.

Turning to FIG. 5, an exemplary method for rounding offset adjustment on a macroblock level to improve perceptual quality is indicated generally by the reference numeral 500. The method 500 includes a start block 505 that passes control to a function block 510. The function block 510 performs an encoding setup, optionally with the aid of an operator, and passes control to a function block 515. The function block 515 analyzes input video content, segments the macroblocks of the input video content into different categories, and passes control to a loop limit block 520. The loop limit block 520 begins a loop (1) over each picture in the input video content, using a variable j=1, . . . , # of pictures, and passes control to a function block 525. The function block 525 calculates the quantization step size q for picture j given the bit rate constraint, and passes control to a function block 530. The function block 530 decides the rounding offset for each macroblock, and passes control to a loop limit block 535. The loop limit block 535 begins a loop (2) over each macroblock in a current picture, using a variable i=1, . . . , # of macroblocks (MB) in picture j, and passes control to a function block 540. The function block 540 adjusts the quantization step size q for MB i based on its content, and passes control to a function block 545. The function block 545 encodes macroblock i at q and s, and passes control to a loop limit block 550. The loop limit block 550 ends the loop (2), and passes control to a loop limit block 555. The loop limit block 555 ends the loop (1), and passes control to an end block 599.

In method 500, the rounding offset value adapts to the content on a MB level. This provides high perceptual quality at areas where fine details are perceptually important, and prevents the encoder from spending too many bits in other areas. However, most existing rate control algorithms do not adapt to the MB-level rounding offset adjustment, and this imposes challenges on the rate control algorithm in obtaining the target bit rate.

Embodiment 3

Figure 6:
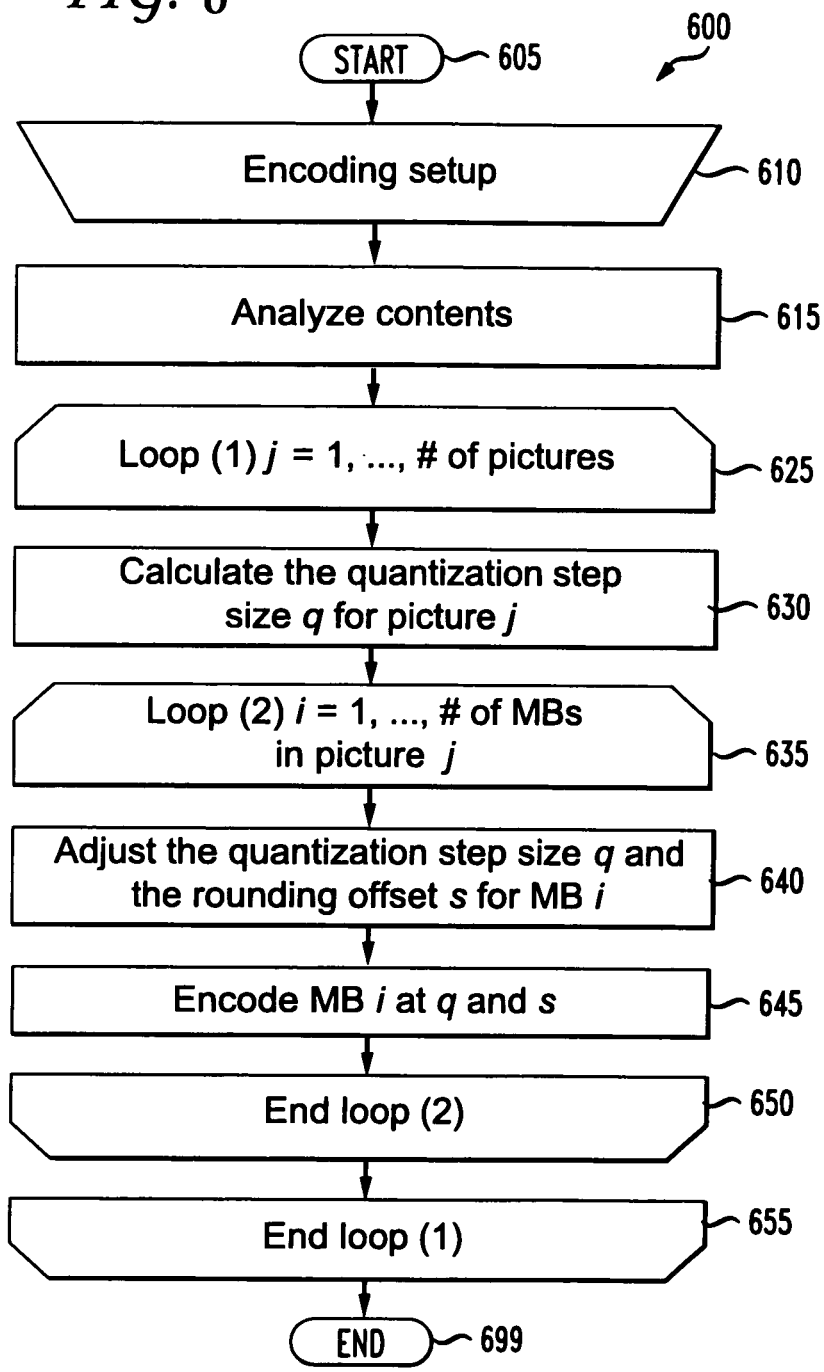
FIG. 6 is a flow diagram showing another exemplary method for rounding offset adjustment on a macroblock level to improve perceptual quality, in accordance with an embodiment of the present principles.

FIG. 6 illustrates a method 600 that is a variation of method 500 described in FIG. 5. In method 600, the rounding offset is decided at each macroblock during the encoding process by considering both the content feature and the available bits. For example, in an embodiment, depending on the variance of the macroblock and the number of bits assigned to the current macroblock, the encoder selects its rounding offset based on a mapping function.

Turning to FIG. 6, another exemplary method for rounding offset adjustment on a macroblock level to improve perceptual quality is indicated generally by the reference numeral 600. The method 600 includes a start block 605 that passes control to a function block 610. The function block 610 performs an encoding setup, optionally with the aid of an operator, and passes control to a function block 615. The function block 615 analyzes input video content, and passes control to a loop limit block 625. The loop limit block 625 begins a loop (1) over each picture in the input video content, using a variable j=1, . . . , # of pictures, and passes control to a function block 630. The function block 630 calculates the quantization step size q for picture j given the bit rate constraint, and passes control to a loop limit block 635. The loop limit block 635 begins a loop (2) over each macroblock in a current picture, using a variable i=1, . . . , # of macroblocks (MB) in picture j, and passes control to a function block 640.

The function block 640 adjusts the quantization step size q and the rounding offset s for MB i based on its content, and passes control to a function block 645. The function block 645 encodes macroblock i at q and s, and passes control to a loop limit block 650. The loop limit block 650 ends the loop (2), and passes control to a loop limit block 655. The loop limit block 655 ends the loop (1), and passes control to an end block 699.

Compared with method 500 of FIG. 5, method 600 provides even more flexibility in choosing the rounding offset value on a macroblock level. Similar to the method in FIG. 5, method 600 also imposes challenges on the rate control algorithm in obtaining the target bit rate.

A Method to Adaptively Select a Rounding Offset

Figure 7:
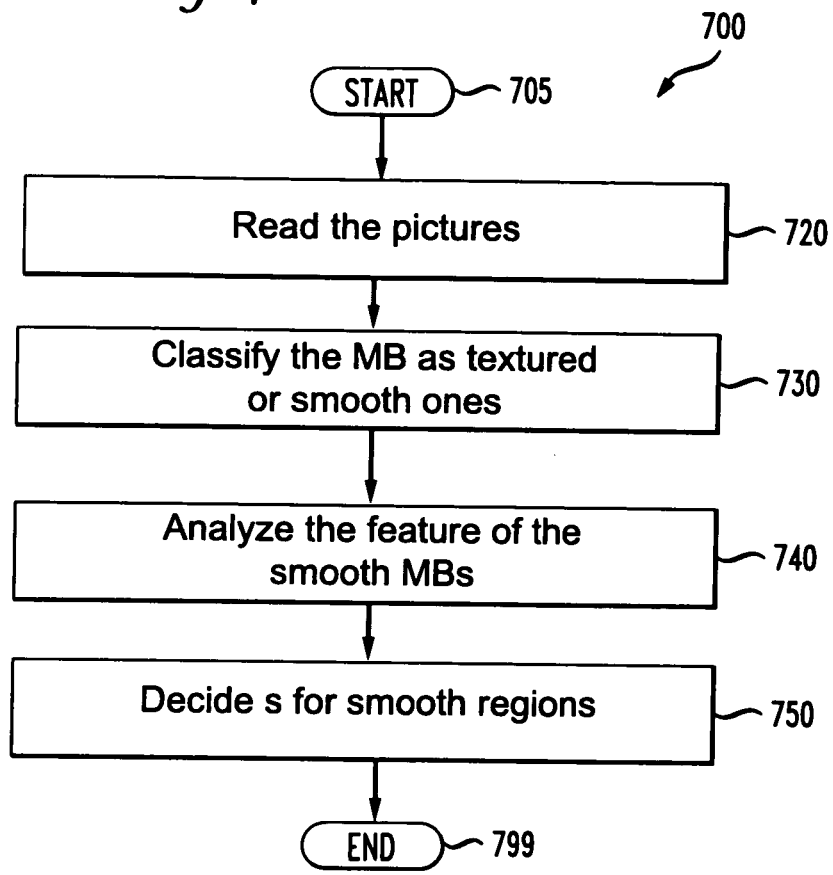
FIG. 7 is a flow diagram showing an exemplary method for determining the rounding offset, in accordance with an embodiment of the present principles.

In FIG. 7, we illustrate by an example how the rounding offset is determined in accordance with one embodiment. In this example, the macroblocks in the video are classified as textured or smooth ones. We focus on the rounding offset adjustment for the smooth regions. For the textured macroblocks, the default rounding offset can be used to optimize the rate-distortion performance. Of course, the example pertains to one way in which the rounding offset is determined. Hence, it is noted that the present principles are not limited to determining the rounding offset only as per the example, as one of ordinary skill in this and related arts will readily contemplate this and various other ways in which to determine the rounding offset given the teachings of the present principles provided herein, while maintaining the spirit of the present principles.

Turning to FIG. 7, an exemplary method for determining the rounding offset is indicated generally by the reference numeral 700. The method 700 includes a start block 705 that passes control to a function block 720. The function block 720 reads the pictures, and passes control to a function block 730. The function block 730 classifies the MBs into textured or smoothed macroblocks, and passes control to a function block 740. The function block 740 analyzes the features of the smooth macroblocks, and passes control to a function block 750. The function block 750 decides the rounding offset s for the smooth regions, and passes control to an end block 799. With respect to function block 740, in one embodiment, the variance in the pixel-domain or transform-domain can be used to analyze the feature as the strength of the fine details. Further with respect to function block 740, in another embodiment, the number of zero coefficients at an estimated quantization step size can be used to indicate the strength. The feature is then mapped to a rounding offset by function block 750. For instance, a macroblock assigns a rounding offset s, if its variance is smaller than a threshold $T_1$, $s_2$ if the variance is smaller than $T_2$ but greater than $T_1$ and $s_3$ otherwise. In yet another embodiment, a function or a look up table can be applied to map the variance to a rounding offset value.

Figure 8:
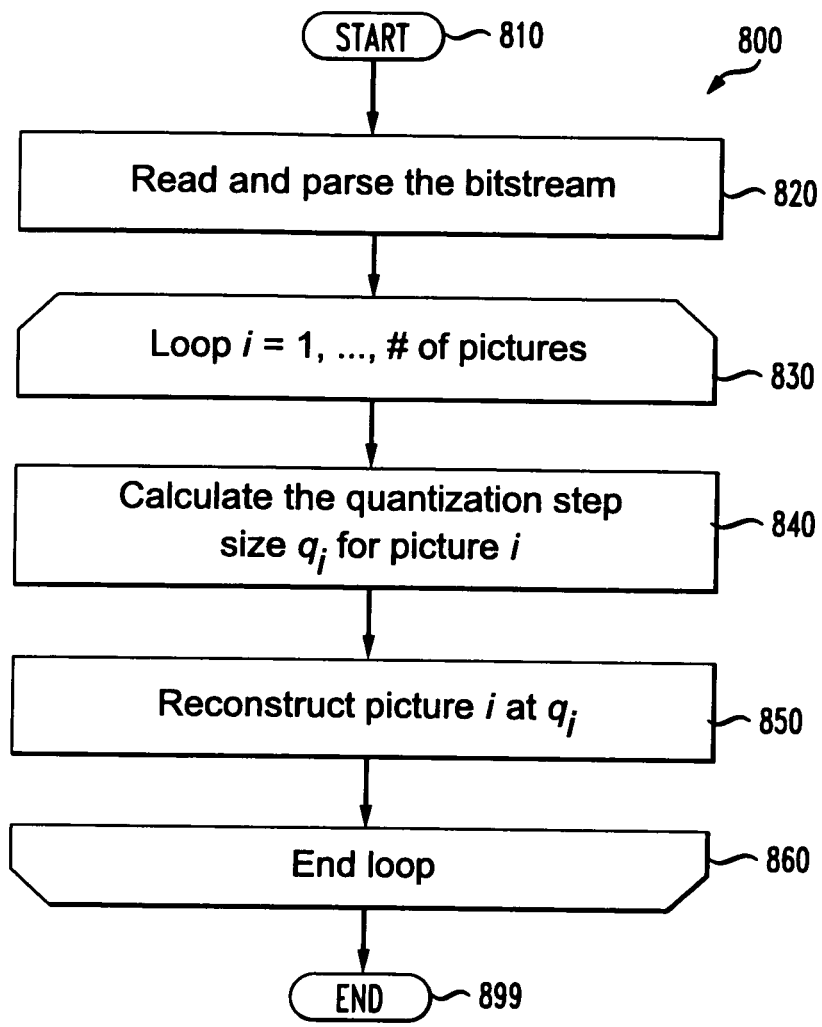
FIG. 8 is a flow diagram showing an exemplary method for decoding picture data, where the rounding offset is known and is not sent in a bitstream, in accordance with an embodiment of the present principles.

Turning to FIG. 8, an exemplary method for decoding picture data, where the rounding offset is known and is not sent in a bitstream, is indicated generally by the reference numeral 800. The method 800 includes a start block 810 that passes control to a function block 820. The function block 820 reads and parses the bitstream, and passes control to a loop limit block 830. The loop limit block 830 begins a loop over each picture in the input video content, using a variable i=1, ..., # of pictures, and passes control to a function block 840. The function block 840 calculates the quantization step size $q_i$ for picture i, and passes control to a function block 850. The function block 850 reconstructs picture i at $q_i$, and passes control to a loop limit block 860. The loop limit block 860 ends the loop, and passes control to an end block 899.

Figure 9:
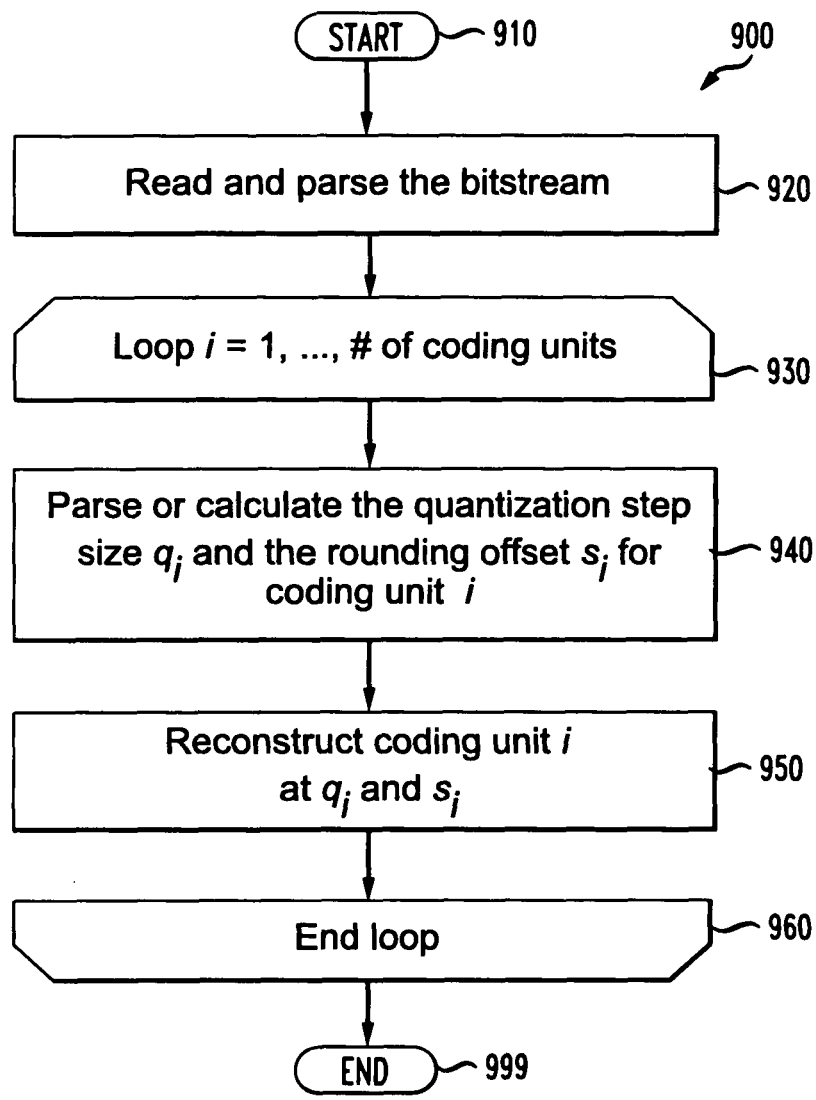
FIG. 9 is a flow diagram showing an exemplary method for reconstructing a coding unit at a decoder using rounding offsets, in accordance with an embodiment of the present principles.

Turning to FIG. 9, an exemplary method for reconstructing a coding unit at a decoder using rounding offsets is indicated generally by the reference numeral 900. The method 900 includes a start block 910 that passes control to a function block 920. The function block 920 reads and parses the bitstream, and passes control to a loop limit block 930. The loop limit block 930 begins a loop over each picture in the input video content, using a variable i=1, ..., # of coding units, and passes control to a function block 940. The function block 940 parses or calculates the quantization step size $q_i$ and the rounding offset $s_i$ for coding unit i, and passes control to a function block 950. The function block 950 reconstructs coding unit i at $q_i$ and $s_i$, and passes control to a loop limit block 960. The loop limit block 960 ends the loop, and passes control to an end block 999. In method 900, a coding unit can be a picture, a group of pictures, a macroblock or a group of macroblocks.

Figure 10:
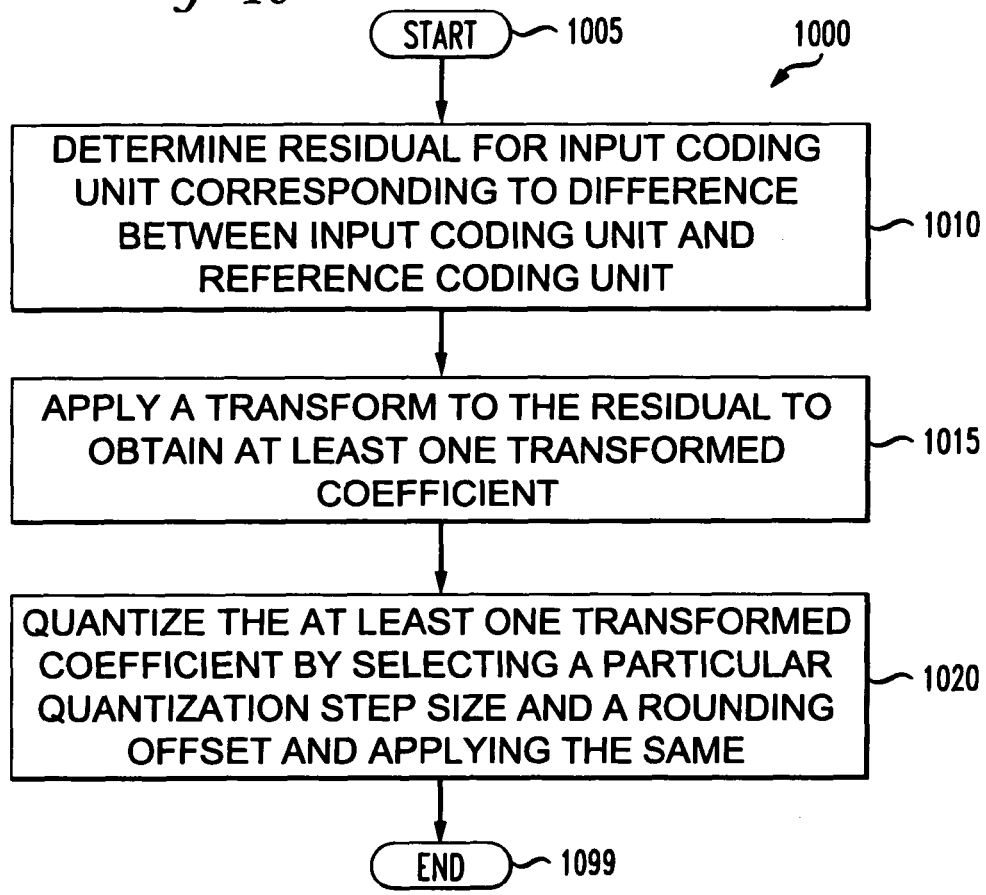
FIG. 10 is a flow diagram showing an exemplary method for encoding an input coding unit at an encoder using rounding offsets, in accordance with an embodiment of the present principles.

Turning to FIG. 10, an exemplary method for encoding an input coding unit at an encoder using rounding offsets is indicated generally by the reference numeral 1000. It is to be appreciated that the method simply shows a portion of the encoding process for the sake of illustration and brevity and is not meant to be representative of an entire coding process. The method 1000 includes a start block 1005 that passes control to a function block 1010. The function block 1010 determines a residual for an input coding unit corresponding to a difference between the input coding unit and a reference coding unit, and passes control to a function block 1015. The function block 1015 applies a transform to the residual to obtain at least one transform coefficient, and passes control to a function block 1020. The function block 1020 quantizes the at least one transform coefficient by selecting a particular quantization step size and a rounding offset and applying the same, and passes control to an end block 1099.

Figure 11:
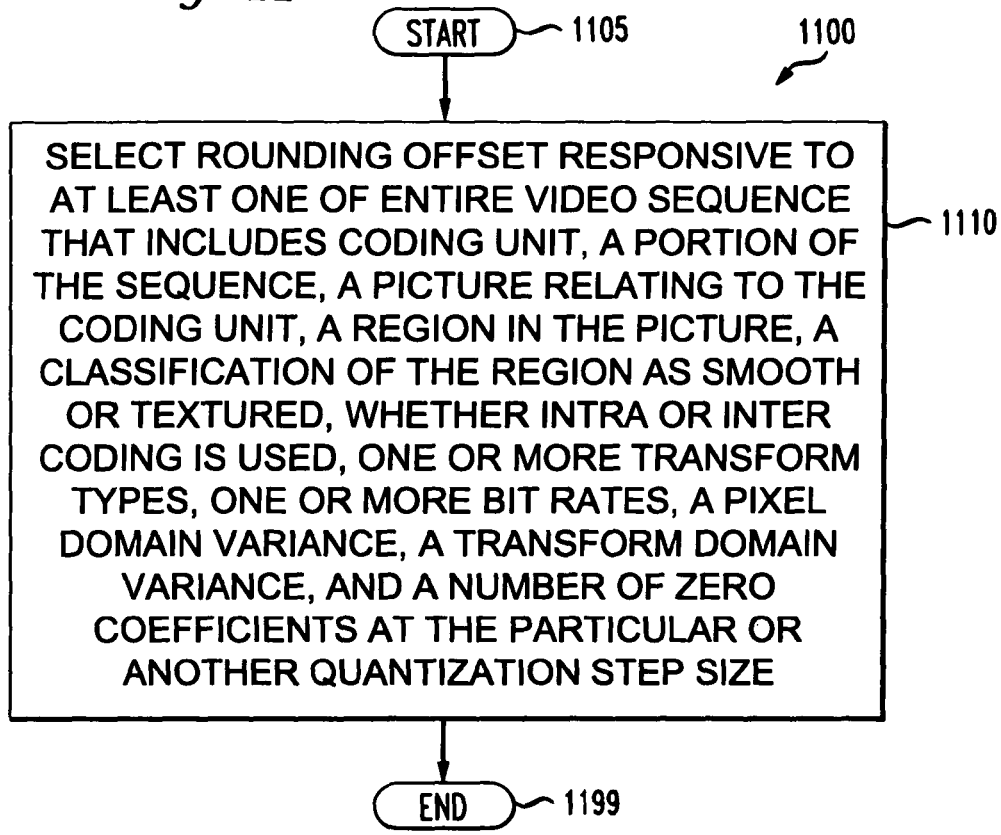
FIG. 11 is a flow diagram showing an exemplary method for selecting rounding offsets, in accordance with an embodiment of the present principles.

Turning to FIG. 11, an exemplary method for selecting rounding offsets is indicated generally by the reference numeral 1100. The method 1100 is intended to show some of the basis upon which rounding offsets may be selected, in accordance with the present principles.

The method 1100 includes a start block 1105 that passes control to a function block 1110. The function block 1110 selects a rounding offset (responsive to at least one of an entire video sequence that includes the coding unit, a portion of the sequence, a picture relating to the coding unit, a region in the picture, a classification of the region as smooth or textured, whether intra or inter coding is used, one or more transform types, one or more bit rates, a pixel-domain variance, a transform-domain variance, and a number of zero coefficients at the particular or another quantization step size), and passes control to an end block 1199.

Figure 12:
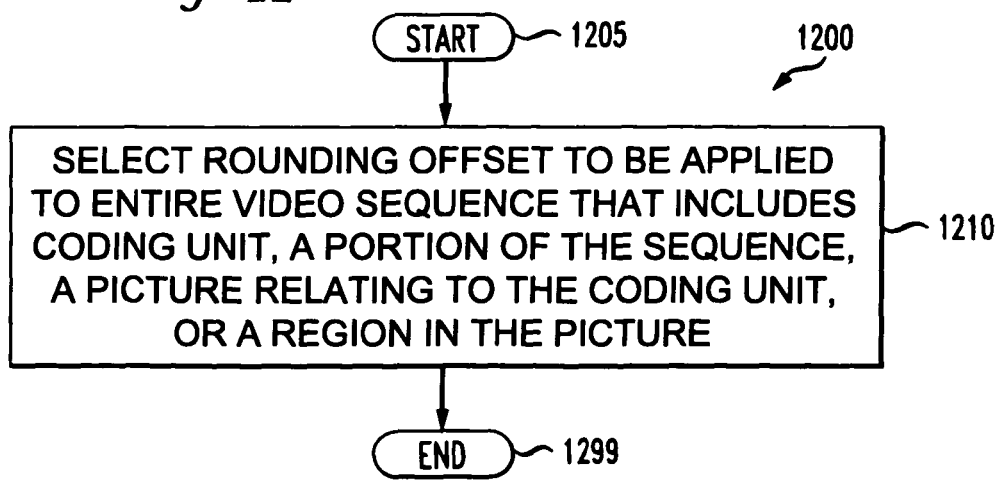
FIG. 12 is a flow diagram showing an exemplary method for applying rounding offsets, in accordance with an embodiment of the present principles.

Turning to FIG. 12, an exemplary method for applying rounding offsets is indicated generally by the reference numeral 1200. The method 1200 is intended to show some of the items to which rounding offsets may be applied, in accordance with the present principles.

The method 1200 includes a start block 1205 that passes control to a function block 1210. The function block 1210 applies a rounding offset (to at least one of an entire video sequence that includes the coding unit, a portion of the sequence, a picture relating to the coding unit, or a region in the picture), and passes control to an end block 1299.

Turning to FIG. 13, an exemplary method for decoding a coding unit at a decoder using rounding offsets is indicated generally by the reference numeral 1300. It is to be appreciated that the method simply shows a portion of the decoding process for the sake of illustration and brevity and is not meant to be representative of an entire decoding process. The method 1300 includes a start block 1305 that passes control to a function block 1310. The function block 1310 receives information describing a selecting rounding offset, and also receives at least one quantized coefficient corresponding to a transformed and quantized difference between an input coding unit and a reference coding unit, and passes control to a function block 1315. The function block 1315 de-quantizes the at least one quantized coefficient to obtain at least one de-quantized coefficient by selecting a particular quantization step size and a rounding offset and applying the same, and passes control to a function block 1320. The function block 1320 applies an inverse transform to the at least one de-quantized coefficient to obtain a reconstructed residual, and passes control to an end block 1399.

A description will now be given of some of the many attendant advantages/features of the present invention, some of which have been mentioned above. For example, one advantage/feature is an apparatus having a video encoder for encoding an input coding unit by determining a residual for the input coding unit corresponding to a difference between the input coding unit and a reference coding unit, applying a transform to the residual to obtain at least one transform coefficient, and quantizing the at least one transform coefficient by selecting a particular quantization step size and a rounding offset.

Another advantage/feature is the apparatus having the video encoder as described above, wherein the rounding offset is selected to be applied to an entire video sequence that includes the coding unit, a portion of the sequence, a picture relating to the coding unit, or a region in the picture.

Yet another advantage/feature is the apparatus having the video encoder wherein the rounding offset is selected to be applied to an entire video sequence that includes the coding unit, a portion of the sequence, a picture relating to the coding unit, or a region in the picture as described above, wherein the portion includes one or more scenes or one or more pictures included in or independent of one or more groups of pictures, and wherein the region includes one or more macroblocks.

Still another advantage/feature is the apparatus having the video encoder wherein the portion includes one or more scenes or one or more pictures included in or independent of one or more groups of pictures, and wherein the region includes one or more macroblocks as described above, wherein different rounding offsets are capable of being applied to different ones of the one or more scenes, the one or more pictures, and the one or more macroblocks.

Moreover, another advantage/feature is the apparatus having the video encoder as described above, wherein the rounding offset is selected responsive to at least one of a pixel-domain variance, a transform-domain variance, and a number of zero coefficients at the particular or another quantization step size.

Further, another advantage/feature is the apparatus having the video encoder as described above, wherein the rounding offset is selected responsive to at least one of an entire video sequence that includes the coding unit, a portion of the video sequence, a picture relating to the coding unit, a region in the picture, and a classification of the region as smooth or textured.

Also, another advantage/feature is the apparatus having the video encoder wherein the rounding offset is selected responsive to at least one of an entire video sequence that includes the coding unit, a portion of the video sequence, a picture relating to the coding unit, a region in the picture, and a classification of the region as smooth or textured as described above, wherein the region includes one or more macroblocks, and the rounding offset is selected and applied only for smooth classified macroblocks while a default rounding offset typically used by the encoder is applied to textured classified macroblocks.

Additionally, another advantage/feature is the apparatus having the video encoder wherein the region includes one or more macroblocks, and the rounding offset is selected and applied only for smooth classified macroblocks while a default rounding offset typically used by the encoder is applied to textured classified macroblocks as described, wherein the rounding offset is selected responsive to at least one of whether the input coding unit is coded using intra or inter prediction, one or more transform types, and one or more different bit rates for encoding the coding unit.

Moreover, another advantage/feature is the apparatus having the video encoder as described above, wherein the encoder embeds information describing the selected rounding offset in a bitstream output by the encoder.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
   a video encoder for encoding an input coding unit by determining a residual for the input coding unit corresponding to a difference between the input coding unit and a reference coding unit, applying a transform to the residual to obtain at least one transform coefficient, and quantizing the at least one transform coefficient by selecting a quantization step size and a rounding offset wherein the rounding offset is selected and applied only for smooth classified macroblocks while a default rounding offset typically used by said encoder is applied to textured classified macroblocks.

2. The apparatus of claim 1, wherein the rounding offset is selected to be applied to an entire video sequence that includes the coding unit, a portion of the sequence, a picture relating to the coding unit, or a region in the picture.

3. The apparatus of claim 2, wherein the portion comprises one or more scenes or one or more pictures included in or independent of one or more groups of pictures, and wherein the region comprises one or more macroblocks.

4. The apparatus of claim 3, wherein different rounding offsets are capable of being applied to each of the one or more scenes, the one or more pictures, and the one or more macroblocks.

5. The apparatus of claim 1, wherein the rounding offset is selected responsive to at least one of a pixel-domain variance, a transform-domain variance, and a number of zero coefficients at the particular or another quantization step size.

6. The apparatus of claim 1, wherein the rounding offset is selected responsive to at least one of an entire video sequence that includes the coding unit, a portion of the video sequence, a picture relating to the coding unit, a region in the picture, and a classification of the region as smooth or textured.

7. The apparatus of claim 6, wherein the region comprises one or more macroblocks.

8. The apparatus of claim 7, wherein the rounding offset is selected responsive to at least one of whether the input coding unit is coded using intra or inter prediction, one or more transform types, and one or more different bit rates for encoding the coding unit.

9. The apparatus of claim 1, wherein said encoder embeds information describing the selected rounding offset in a bitstream output by said encoder.

10. In a video encoder, a method for encoding an input coding unit comprising:
determining a residual for the input coding unit corresponding to a difference between the input coding unit and a reference coding unit;
applying a transform to the residual to obtain at least one transform coefficient; and
quantizing the at least one transform coefficient by selecting a quantization step size and a rounding offset wherein the rounding offset is selected and applied only for smooth classified macroblocks while a default rounding offset typically used by said encoder is applied to textured classified macroblocks.

11. The method of claim 10, wherein the rounding offset is selected to be applied to an entire video sequence that includes the coding unit, a portion of the sequence, a picture relating to the coding unit, or a region in the picture.

12. The method of claim 11, wherein the portion comprises one or more scenes or one or more pictures included in or independent of one or more groups of pictures, and wherein the region comprises one or more macroblocks.

13. The method of claim 12, wherein different rounding offsets are capable of being applied to each of the one or more scenes, the one or more pictures, and the one or more macroblocks.

14. The method of claim 10, wherein the rounding offset is selected responsive to at least one of a pixel-domain variance, a transform-domain variance, and a number of zero coefficients at the particular or another quantization step size.

15. The method of claim 10, wherein the rounding offset is selected responsive to at least one of an entire video sequence that includes the coding unit, a portion of the video sequence, a picture relating to the coding unit, a region in the picture, and a classification of the region as smooth or textured.

16. The method of claim 15, wherein the region comprises one or more macroblocks.

17. The method of claim 16, wherein the rounding offset is selected responsive to at least one of whether the input coding unit is coded using intra or inter prediction, one or more transform types, and one or more different bit rates for encoding the coding unit.

18. The method of claim 10, further comprising embedding information describing the selected rounding offset in a bitstream output by said encoder.

19. An apparatus, comprising:
a video decoder for decoding a coding unit by receiving at least one quantized coefficient corresponding to a transformed and quantized residual between an original version of the coding unit and a reference coding unit, de-quantizing the at least one quantized coefficient to obtain at least one de-quantized coefficient by determining a quantization step size and a rounding offset, and applying an inverse transform to the at least one de-quantized coefficient to obtain a reconstructed residual,
wherein said video decoder receives information describing the selected rounding offset from a bitstream that includes the at least one quantized coefficient wherein the rounding offset is selected and applied only for smooth classified macroblocks while a default rounding offset typically used by said encoder is applied to textured classified macroblocks.

20. In a video decoder, a method for decoding a coding unit comprising:
receiving at least one quantized coefficient corresponding to a transformed and quantized residual between an original version of the coding unit and a reference coding unit;
de-quantizing the at least one quantized coefficient to obtain at least one de-quantized coefficient by selecting a quantization step size and a rounding offset; and
applying an inverse transform to the at least one de-quantized coefficient to obtain a reconstructed residual,
wherein said video decoder receives information describing the selected rounding offset from a bitstream that includes the at least one quantized coefficient wherein the rounding offset is selected and applied only for smooth classified macroblocks while a default rounding offset typically used by said encoder is applied to textured classified macroblocks.

21. A nontransitory computer readable storage media having video signal data encoded thereupon, comprising:
an input coding unit encoded by determining a residual for the input coding unit corresponding to a difference between the input coding unit and a reference coding unit, applying a transform to the residual to obtain at least one transform coefficient, and quantizing the at least one transform coefficient by selecting a quantization step size and a rounding offset wherein the rounding offset is selected and applied only for smooth classified macroblocks while a default rounding offset typically used by said encoder is applied to textured classified macroblocks.

* * * * *